United States Patent [19]
Moore et al.

[11] Patent Number: 5,437,017
[45] Date of Patent: Jul. 25, 1995

[54] METHOD AND SYSTEM FOR MAINTAINING TRANSLATION LOOKASIDE BUFFER COHERENCY IN A MULTIPROCESSOR DATA PROCESSING SYSTEM

[75] Inventors: Charles R. Moore; John S. Muhich, both of Austin, Tex.

[73] Assignee: International Business Machines Corporation, Armonk, N.Y.

[21] Appl. No.: 959,189

[22] Filed: Oct. 9, 1992

[51] Int. Cl.[6] .............................................. G06F 12/08
[52] U.S. Cl. .............................. 395/400; 364/DIG. 1; 364/DIG. 2; 364/256.3; 364/256.4; 364/261.1
[58] Field of Search ............... 395/425, 200, 250, 375, 395/400, 800, 600; 364/DIG. 1 MS File, DIG. 2 MS File

[56] References Cited

U.S. PATENT DOCUMENTS

| | | |
|---|---|---|
| 4,733,348 | 3/1988 | Hiraoka et al. |
| 5,113,514 | 5/1992 | Albonesi et al. ............ 395/425 |
| 5,197,139 | 3/1993 | Emma et al. ................ 395/400 |
| 5,283,886 | 2/1994 | Nishii et al. ................ 395/425 |
| 5,297,269 | 3/1994 | Donaldson et al. ......... 395/425 |
| 5,303,362 | 4/1994 | Butts, Jr. et al. ........... 395/425 |
| 5,333,296 | 6/1994 | Bouchard et al. ........... 395/425 |

OTHER PUBLICATIONS

Patricia J. Teller, "Translation-Lookaside Buffer Consistency", Jun. 23, 1990, pp. 26–36.
IBM Technical Disclosure Bulletin, "Early Release of a Processor Following Address Translation Prior to Page Access Checking", Mar., 1991, pp. 371–374.

*Primary Examiner*—Robert B. Harrell
*Attorney, Agent, or Firm*—Michael A. Davis; Andrew J. Dillon

[57] ABSTRACT

Translation lookaside buffers (TLB) are often utilized in the data processing system to efficiently translate an effective or virtual address to a real address within system memory. In systems which include multiple processors which may all access system memory, each processor may include a translation lookaside buffer (TLB) for translating effective addresses to real addresses and coherency between all translation lookaside buffers (TLB) must therefore be maintained. The method and system disclosed herein may be utilized to broadcast a unique bus structure in response to an execution of a translation lookaside buffer invalidate (TLBI) instruction by any processor within a multiprocessor system. The bus structure is accepted by other processors along the bus only in response to an absence of a pending translation lookaside buffer invalidate (TLBI) instruction within each processor. Thus, a broadcast translation lookaside buffer invalidate (TLBI) instruction may only be executed by the other processors within a multiprocessor system if it has been accepted by all processors within the system. After initiating execution of a translation lookaside buffer invalidate (TLBI) instruction at all processors within the system, the execution of pending instructions is temporarily terminated until after the translation lookaside buffer invalidate (TLBI) instruction has been executed. Thereafter, the execution of instructions is suspended until all read and write operations within the memory queue have achieved coherency. Next, all suspended and/or prefetched instructions are refetched utilizing the modified translation lookaside buffer (TLB) to ensure that the address utilized is still valid.

14 Claims, 5 Drawing Sheets

METHOD AND SYSTEM FOR MAINTAINING TRANSLATION LOOKASIDE BUFFER COHERENCY IN A MULTIPROCESSOR DATA PROCESSING SYSTEM

BACKGROUND OF THE INVENTION

1. Technical Field

The present invention relates in general to improved multiprocessor data processing systems, and in particular to an improved method and system for maintaining memory coherence in a multiprocessor data processing system. Still more particularly, the present invention relates to an improved method and system for maintaining translation lookaside buffer (TLB) coherency in a multiprocessor data processing system without requiring the utilization of interprocessor interrupts.

2. Description of the Related Art

Designers of modern state-of-the-art data processing systems are continually attempting to enhance the performance aspects of such systems. One technique for enhancing data processing system efficiency is the achievement of short cycle times and a low Cycle's-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a multiscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In such systems a significant pipeline delay penalty may result from the execution of conditional branch instructions. Conditional branch instructions are instructions which dictate the taking of a specified conditional branch within a application in response to a selected outcome of the processing of one or more other instructions. Thus, by the time a conditional branch instruction propagates through a pipeline queue to an execution position within the queue, it will have been necessary to load instructions into the queue behind the conditional branch instruction prior to resolving the conditional branch in order to avoid run-time delays.

Another source of delays within multiscalar processor systems is the fact that such systems typically execute multiple tasks simultaneously. Each of these multiple tasks typically has a effective or virtual address space which is utilized for execution of that task. Locations within such a effective or virtual address space include addresses which "map" to a real address within system memory. It is not uncommon for a single space within real memory to map to multiple effective or virtual memory addresses within a multiscalar processor system. The utilization of effective or virtual addresses by each of the multiple tasks creates additional delays within a multiscalar processor system due to the necessity of translating these addresses into real addresses within system memory, so that the appropriate instruction or data may be retrieved from memory and placed within an instruction queue for dispatching to one of the multiple independent functional units which make up the multiscalar processor system.

One technique whereby effective or virtual memory addresses within a multiscalar processor system may be rapidly translated to real memory addresses within system memory is the utilization of a so-called "translation lookaside buffer" (TLB). A translation lookaside buffer (TLB) is a buffer which contains translation relationships between effective or virtual memory addresses and real memory addresses which have been generated utilizing a translation algorithm. While the utilization of translation lookaside buffer (TLB) devices provides a reasonably efficient method for translating addresses, the utilization of such buffers in tightly coupled symmetric multiprocessor systems causes a problem in coherency. In data processing systems in which multiple processors may read from and write to a common system real memory care must be taken to ensure that the memory system operates in a coherent manner. That is, the memory system is not permitted to become incoherent as a result of the operations of multiple processors. Each processor within such a multiprocessor data processing system typically includes a translation lookaside buffer (TLB) for address translation and the shared aspect of memory within such systems requires that changes to a single translation lookaside buffer (TLB) within one processor in a multiprocessor system be carefully and consistently mapped into each translation lookaside buffer (TLB) within each processor within the multiprocessor computer system in order to maintain coherency.

The maintenance of translation lookaside buffer (TLB) coherency in prior art multiprocessor systems is typically accomplished utilizing interprocessor interrupts and software synchronization for all translation lookaside buffer (TLB) modifications. These approaches can be utilized to ensure coherency throughout the multiprocessor system; however, the necessity of utilizing interrupts and software synchronization results in a substantial performance degradation within a multiprocessor computer system.

It should therefore be apparent that a need exists for a method and system which may be utilized to maintain translation lookaside buffer coherency in a multiprocessor data processing system without the requirement for utilizing interprocessor interrupts.

SUMMARY OF THE INVENTION

It is therefore one object of the present invention to provide an improved multiprocessor data processing system.

It is another object of the present invention to provide an improved method and system for maintaining memory coherence in a multiprocessor data processing system.

It is still another object of the present invention to provide an improved method and system for maintaining translation lookaside buffer (TLB) coherency in a multiprocessor data processing system without requiring the utilization of interprocessor interrupts.

The foregoing objects are achieved as is now described. Translation lookaside buffers (TLB) are often utilized in the data processing system to efficiently translate an effective or virtual address to a real address within system memory. In systems which include multiple processors which may all access system memory, each processor may include a translation lookaside buffer (TLB) for translating effective addresses to real addresses and coherency between all translation lookaside buffers (TLB) must therefore be maintained. The method and system disclosed herein may be utilized to broadcast a unique bus structure in response to an execution of a translation lookaside buffer invalidate (TLBI) instruction by any processor within a multiprocessor system. The bus structure is accepted by other processors along the bus only in response to an absence of a pending translation lookaside buffer invalidate (TLBI) instruction within each processor. Thus, a broadcast translation lookaside buffer invalidate (TLBI) instruction may only be executed by the other processors within a multiprocessor system if it has been accepted by all processors within the system. After initiating execution of a translation lookaside buffer invalidate (TLBI) instruction at all processors within the system, the execution of pending instructions is temporarily terminated until after the translation lookaside buffer invalidate (TLBI) instruction has been executed. Thereafter, the execution of instructions is suspended until all read and write operations within the memory queue have achieved coherency. Next, all suspended and/or prefetched instructions are refetched utilizing the modified translation lookaside buffer (TLB) to ensure that the address utilized is still valid.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
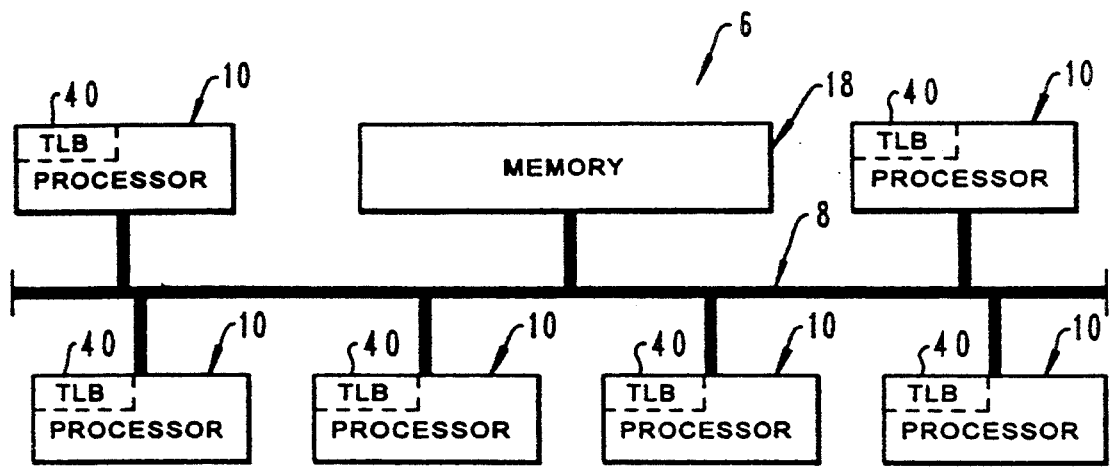
FIG. 1 is a high level block diagram depicting a multiprocessor data processing system which may be utilized to implement the method and system of the present invention.

With reference now to the figures and in particular with reference to FIG. 1, there is depicted a high level block diagram illustrating a multiprocessor data processing system 6 which may be utilized to implement the method and system of the present invention. As illustrated, multiprocessor data processing system 6 may be constructed utilizing multiscalar processors 10 which are each coupled to system memory 18 utilizing bus 8. In a tightly-coupled symmetric multiprocessor system, such as multiprocessor data processing system 6, each processor 10 within multiprocessor data processing system 6 may be utilized to read from and write to memory 18. Thus, systems and interlocks must be utilized to ensure that the data and instructions within memory 18 remain coherent.

As illustrated within FIG. 1, and as will be explained in greater detail herein, each processor 10 within multiprocessor data processing system 6 includes a translation lookaside buffer (TLB) 40 which may be utilized to efficiently translate effective or virtual addresses for instructions or data into real addresses within system memory 18. In view of the fact that a translation lookaside buffer (TLB) constitutes a memory space, it is important to maintain coherency among each translation lookaside buffer (TLB) 40 within multiprocessor data processing system 6 in order to assure accurate operation thereof.

Figure 2:
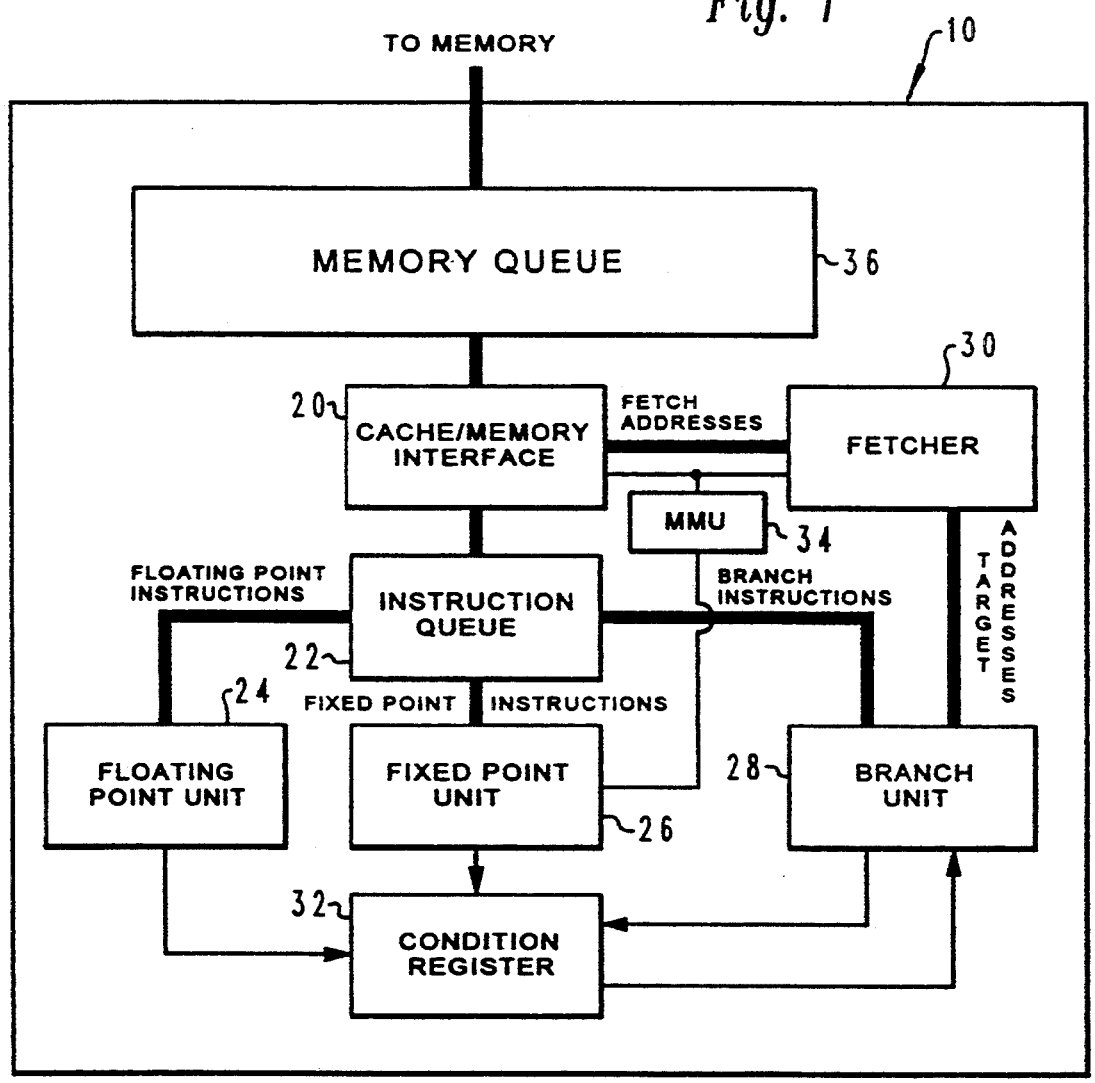
FIG. 2 is a high level block diagram depicting one multiscalar processor within the multiprocessor data processing system of FIG. 1.

Referring now to FIG. 2, there is depicted a high level block diagram of a multiscalar processor 10 which may be utilized to provide multiprocessor data processing system 6 of FIG. 1. As illustrated, multiscalar processor 10 preferably includes a memory queue 36 which may be utilized to store data, instructions and the like which is read from or written to system memory 18 (see FIG. 1) by multiscalar processor 10. Data or instructions stored within memory queue 36 are preferably accessed utilizing cache/memory interface 20 in a method well known to those having skill in the art. The sizing and utilization of cache memory systems ia well known subspecialty within the data processing art and not addressed within the present application. However, those skilled in the art will appreciate that by utilizing modern associated cache techniques a large percentage of memory accesses may be achieved utilizing data temporarily stored within cache/memory interface 20.

Instructions from cache/memory interface 20 are typically loaded into instruction queue 22 which preferably includes a plurality of queue positions. In a typical embodiment of a multiscalar computer system the instruction queue may include eight queue positions and thus, in a given cycle, between zero and eight instructions may be loaded into instruction queue 22, depending upon how many valid instructions are passed by cache/memory interface 20 and how much space is available within instruction queue 22.

As is typical in such multiscalar processor systems, instruction queue 22 is utilized to dispatch instructions to multiple execution units. As depicted within FIG. 2, multiscalar processor 10 includes a floating point processor unit 24, a fixed point processor unit 26, and a branch processor unit 28. Thus, instruction queue 22 may dispatch between zero and three instructions during a single cycle, one to each execution unit.

In addition to sequential instructions dispatched from instruction queue 22, so-called "conditional branch instructions" may be loaded into instruction queue 22 for execution by the branch processor. A conditional branch instruction is an instruction which specifies an associated conditional branch to be taken within the application in response to a selected outcome of processing one or more sequential instructions. In an effort to minimize run-time delay in a pipelined processor system, such as multiscalar processor 10, the presence of a conditional branch instruction within the instruction queue is detected and an outcome of the conditional branch is predicted. As should be apparent to those having skill in the art when a conditional branch is predicted as "not taken" the sequential instructions within the instruction queue simply continue along a current path and no instructions are altered. However, if the prediction as to the occurrence of the branch is incorrect, the instruction queue must be purged of sequential instruction, which follow the conditional branch instruction in program order and target instructions must be fetched. Alternately, if the conditional branch is predicted as "taken" then the target instructions are fetched and utilized to follow the conditional branch, if the prediction is resolved as correct. And of course, if the prediction of "taken"0 is incorrect the target instructions must be purged and the sequential instructions which follow the conditional branch instruction in program order must be retrieved.

As illustrated, multiscalar processor 10 also preferably includes a condition register 32. Condition register 32 is utilized to temporarily store the results of various comparisons which may occur utilizing the outcome of sequential instructions which are processed within multiscalar processor 10. Thus, floating point processor unit 24, fixed point processor unit 26 and branch processor unit 28 are all coupled to condition register 32. The status of a particular condition within condition register 32 may be detected and coupled to branch processor unit 28 in order to generate target addresses, which are then utilized to fetch target instructions in response to the occurrence of a condition which initiates a branch.

Thereafter, a branch processor unit 28 couples target addresses to fetcher 30. Fetcher 30 calculates fetch addresses for the target instructions necessary to follow the conditional branch and couples those fetch addresses to cache/memory interface 20. As will should appreciated by those having skill in the art, if the target instructions associated with those fetch addresses are present within cache/memory interface 20, those target instructions are loaded into instruction queue 22. Alternately, the target instructions may be fetched from memory 18 and thereafter loaded into instruction queue 22 from cache/memory interface 20 after a delay required to fetch those target instructions.

As those skilled in the art will appreciate, each task within multiscalar processor 10 will typically have associated therewith an effective or virtual memory space and instructions necessary to implement each task will be set forth within that space utilizing effective or virtual addresses. Thus, fetcher 30 must be able to determine the real address for instructions from the effective addresses utilized by each task. As described above, prior art implementations of fetcher 30 typically either incorporate a complex translation lookaside buffer (TLB), sequence register and multiple translation algorithms or, alternately, such instruction fetchers are required to access a memory management unit (MMU) having such complex translation capability in order to determine real instruction addresses from effective or virtual instruction addresses.

Also depicted within multiscalar processor 10 is memory management unit (MMU) 34. Memory management unit, as will be described in greater detail herein, preferably includes a translation lookaside buffer (TLB) and all necessary registers and translation algorithms which may be utilized to translate each effective address within multiscalar processor 10 into real address within system memory 18. Fetcher units typically have a very low priority for accessing a memory management unit (MMU) and therefore some delay is expected in the obtaining of real instruction address utilizing a memory management unit (MMU).

Figure 3:
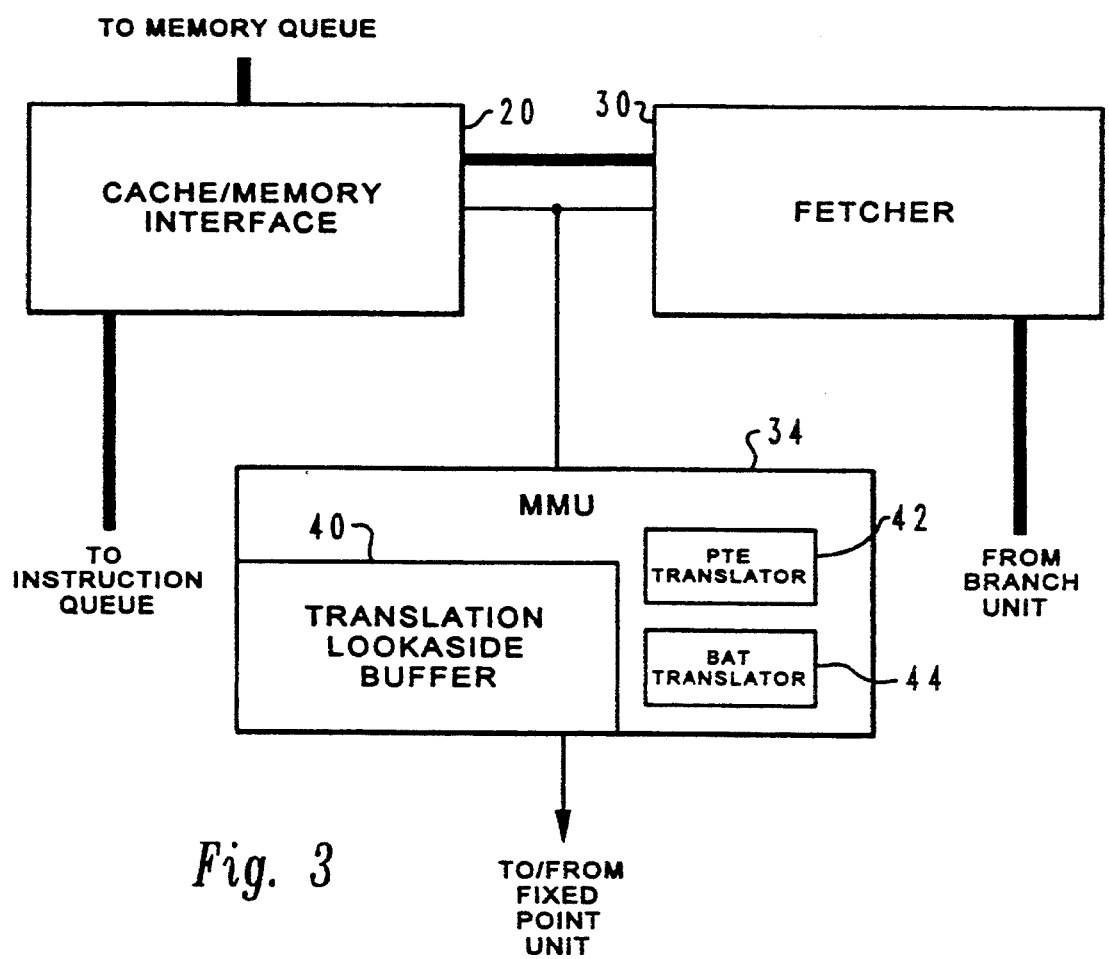
FIG. 3 is a more detailed block diagram depicting a translation lookaside buffer (TLB) and memory management unit (MMU) within the multiscalar processor of FIG. 2.

With reference now to FIG. 3, there is depicted a more detailed block diagram illustrating a translation lookaside buffer (TLB) and memory management unit (MMU) within multiscalar processor 10 of FIG. 2. As illustrated within FIG. 3, the relationship between cache/memory interface 20, fetcher 30 and memory management unit (MMU) 34 is depicted. As is typical in known memory management units, memory management unit (MMU) 34 includes a substantially sized translation lookaside buffer (TLB) 40. Those skilled in the art will appreciate that a translation lookaside buffer (TLB) is often utilized as a fairly rapid technique for translating from effective or virtual address to real address. Also present within memory management unit (MMU) 34 is PTE translator 42 and BAT translator 44. PTE translator 42 is preferably utilized to implement page table type translation and BAT translator 44 is utilized to translate address block type translations. Those skilled in the art will appreciate that these two translation algorithms are substantially different, in that a page table translation occurs within a system having consistently sized memory pages while an address block translation may result in a defined address block having, for example, a size ranging from twenty-eight kilobyte block to eight megabytes of memory.

Thus, upon reference to FIG. 3, those skilled in the art will appreciate that by utilizing translation lookaside buffer (TLB) 40 in conjunction with PTE translator 42, all effective addresses within multiscalar processor 10 (see FIG. 2), which utilizes the page table translation may be translated into a real address within system memory. Of course, those skilled in the art will also appreciate that a segment register may also be utilized for such translations. Alternately, address block translations may be accomplished utilizing only BAT translator 44. By providing multiple translation algorithms in the manner depicted, every effective or virtual address within multiscalar processor 10 may be translated into a real address within system memory by utilizing memory management unit (MMU) 34.

As those skilled in the art will appreciate fetcher 30 is utilized to couple fetch addresses to cache/memory interface 20 for target instructions which are selected by branch unit 28. For each target address coupled to fetcher 30 from branch unit 28 a fetch address is determined and coupled to cache/memory interface 20. In the depicted embodiment of the present invention, these addresses may often be determined by accessing translation lookaside buffer (TLB) 40 within memory management unit 34. Thus, it should be apparent that in order to maintain coherence within each multiscalar processor 10 within multiprocessor data processing system 6 it will be necessary to maintain coherence between each translation lookaside buffer (TLB) 40 within each multiscalar processor 10.

Figure 4:
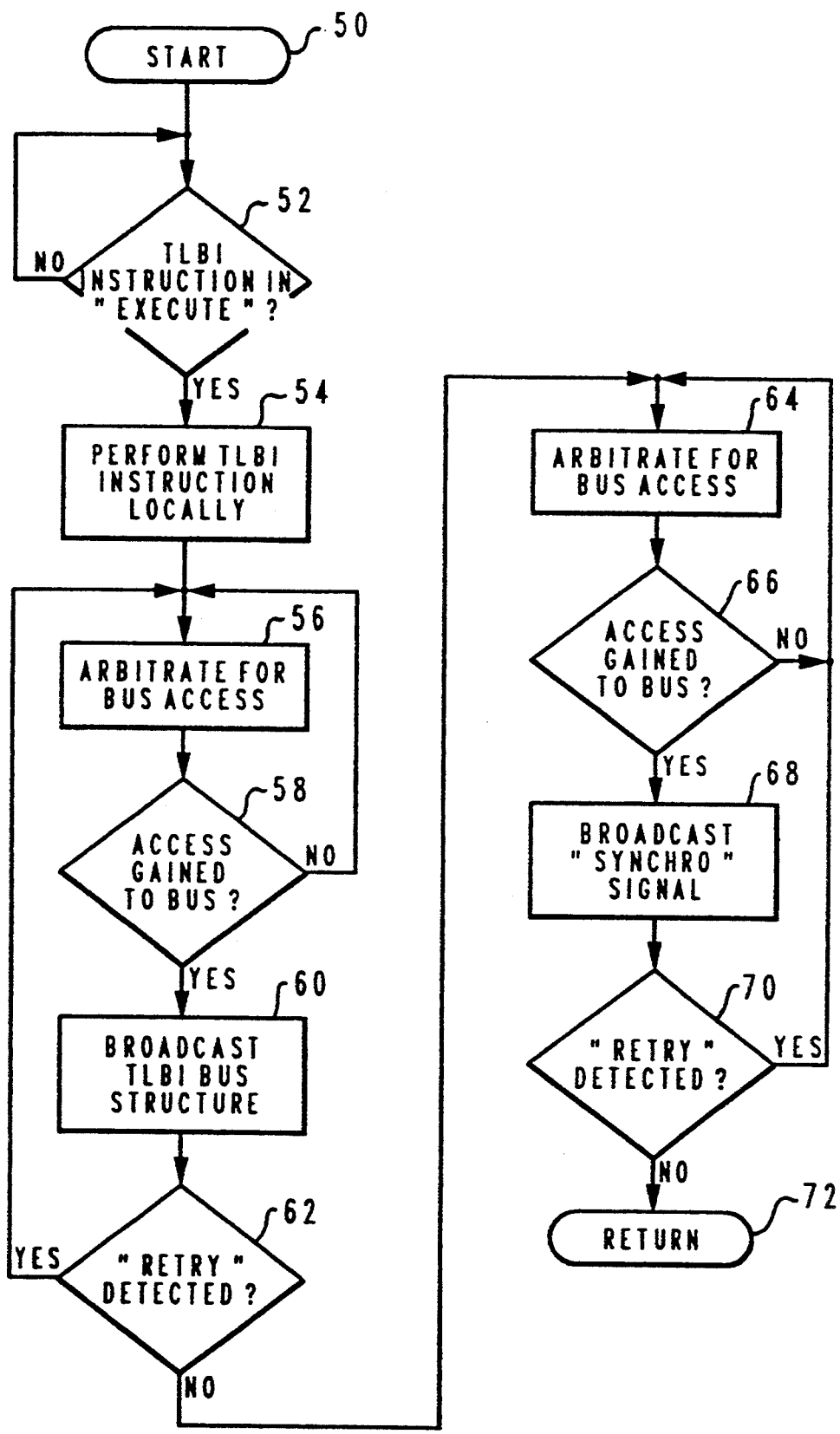
FIG. 4 is a high level logic flowchart illustrating the initiation of a translation lookaside buffer invalidate (TLBI) instruction at one multiscalar processor within the multiprocessor data processing system of FIG. 1 in accordance with the method and system of the present invention.

Referring now to FIG. 4, there is depicted a high level logic flowchart which illustrates the initiation of a translation lookaside buffer invalidate (TLBI) instruction by one multiscalar processor within multiprocessor data processing system 6 of FIG. 1. Those skilled in the art will appreciate that a translation lookaside buffer invalidate (TLBI) instruction is issued within the data processing system in order to invalidate an entry within a translation lookaside buffer (TLB) which might otherwise be utilized to translate effective or virtual addresses into real addresses within system memory. Such situations will, of course, occur as a result of the relocation of data or instructions within system memory or as a result of any other operation which modifies the translation relationship between an effective or virtual address and its real address within system memory.

As depicted within FIG. 4, the process begins at block 50 and thereafter passes to block 52. Block 52 illustrates a determination of whether or not a translation lookaside buffer invalidate (TLBI) instruction is within the "EXECUTE" position within a fixed point processor in a multiscalar processor within multiprocessor data processing system 6 of FIG. 1. If this situation does not occur, the process merely iterates until such time as translation lookaside buffer invalidate (TLBI) instruction is detected within the "EXECUTE" position in a fixed point processor unit within the system. After detecting a translation lookaside buffer invalidate (TLBI) instruction the process passes to block 54. Block 54 illustrates the performance of the translation lookaside buffer invalidate (TLBI) instruction locally, upon the translation lookaside buffer (TLB) within the local multiscalar processor. Thereafter, the process passes to block 56.

Block 56 illustrates the arbitration for bus access by the local multiscalar processor and thereafter, the process passes to block 58. Block 58 illustrates a determination of whether or not access has been granted to bus 8 (see FIG. 1) and if not, the process returns iteratively to block 56 to again attempt to arbitrate for bus access. After gaining access to bus 8, as determined at block 58, the process passes to block 60. Block 60 illustrates the broadcasting on bus 8 of a translation lookaside buffer invalidate (TLBI) bus structure, which is associated with the translation lookaside buffer invalidate (TLBI) instruction which has just been executed. Upon reference to the foregoing those skilled in the art will appreciate that an existing memory bus structure may be utilized with an expanded set of transaction codes and that the translation lookaside buffer invalidate (TLBI) instruction may be either an "index" based invalidate, or may comprise the broadcasting of a full virtual address of the page which is being invalidated by the translation lookaside buffer invalidate (TLBI) instruction.

Next, the process passes to block 62. Block 62 illustrates the determination of whether or not a "RETRY" message has been detected, indicating that one of the multiscalar processor systems within multiprocessor processing systems 6 has not accepted the broadcast translation lookaside buffer invalidate (TLBI) bus structure. If this occurs, the process returns to block 56 in an iterative fashion to once again attempt to broadcast the translation lookaside buffer invalidate (TLBI) bus structure in the manner described above. However, in the event a "RETRY" message is not detected, indicating that each multiscalar processor system within multiscalar data processing system 6 has accepted the broadcast translation lookaside buffer invalidate (TLBI) bus structure, the process then passes to block 64. Block 64 once again illustrates the arbitration by the local multiscalar processor for bus access and the process then passes to block 66. Block 66 illustrates a determination of whether or not access to the bus has been gained. If no access has been gained, the process returns iteratively to block 64 until such time as bus access has been gained.

Referring now to block 68, after gaining access to the bus block 68 illustrates the broadcasting of a "SYNCHRO" signal by the initially executing processor within multiprocessor data processing system 10. This signal is utilized to determine whether or not each multiscalar processor within the multiprocessor data processing system has executed the translation lookaside buffer invalidate (TLBI) instruction.

Referring now to block 70 in the event a "RETRY" message is detected, indicating that one or more processors within multiprocessor data processing system 6 have failed to complete the translation lookaside buffer invalidate (TLBI) instruction, the process returns lteratively to block 64 to once again attempt to obtain confirmation that all multiscalar processors within multiprocessor data processing system 6 have executed the translation lookaside buffer invalidate (TLBI) instruction. After receiving an indication that each processor has executed the instruction, the process passes to block 72 and returns.

Figure 5:
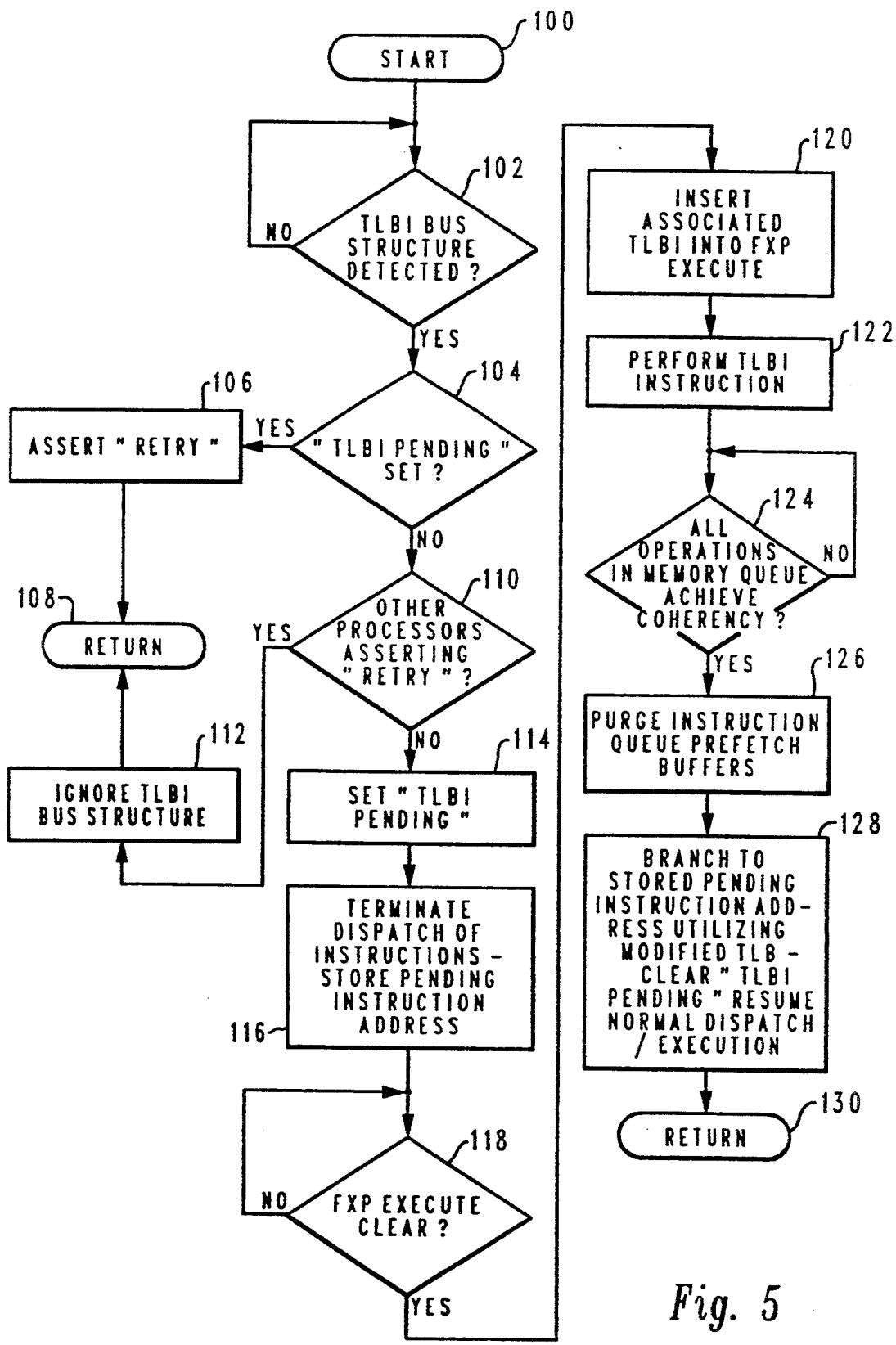
FIG. 5 is a high level logic flowchart illustrating the processing of a translation lookaside buffer invalidate (TLBI) instruction throughout the multiprocessor data processing system of FIG. 1 in accordance with the method and system of the present invention.

With reference now to FIG. 5, there is depicted a high level logic flowchart illustrating the processing of a translation lookaside buffer invalidate (TLBI) instruction throughout the multiprocessor data processing system of FIG. 1 in accordance with the method and system of the present invention. As illustrated, this process begins at block 100 and thereafter passes to block 102. Block 102 illustrates a determination of whether or not the translation lookaside buffer invalidate (TLBI) bus structure which was broadcast along bus 8 has been detected at a multiscalar processor within multiprocessor data processing system 6. If not, the process merely iterate s until such time as this event occurs.

Still referring to block 102, in the event a translation lookaside buffer invalidate (TLBI) bus structure has been detected, the process passes to block 104. Block 104 illustrates a determination of whether or not the flag "TLBI PENDING" has been set, indicating that a previous translation lookaside buffer invalidate (TLBI) is still pending and has not yet completed execution. If so, the process passes to block 106 illustrates the assertion of the "RETRY" message, indicating that the current multiscalar processor has not accepted the translation lookaside buffer invalidate (TLBI) bus structure. Thereafter, the process passes to block 108 and returns.

Referring again to block 104, in the event the flag "TLBI PENDING" is not set, the process passes to block 110. Block 110 illustrates a determination of whether or not any other multiscalar processor within multiprocessor data processing system 6 has asserted a "RETRY" message, indicating that the translation lookaside buffer invalidate (TLBI) bus structure was not accepted at another processor. If so, the process passes to block 112. Block 112 illustrates the ignoring of the translation lookaside buffer invalidate (TLBI) bus structure and the process then passes to block 108 and returns.

Referring again to block 110, in the event the "TLBI PENDING" flag is not set and no other processor within multiprocessor data processing system 6 has asserted a "RETRY" message, the process passes to block 114. Block 114 illustrates the setting of the "TLBI PENDING" flag and the process of executing the translation lookaside buffer invalidate (TLBI) instruction begins.

Referring now to block 116, the process illustrated therein depicts the terminating of the dispatching of instructions within the multiscalar processor and the storing of the addresses for those instructions which are pending within the queue within that processor. Next, the process passes to block 118. Block 118 illustrates a determination of whether or not the "EXECUTE" position within the fixed point processor has cleared, indicating that no pending instruction is about to execute. If not, the process merely iterates until such time as this condition occurs.

Still referring to block 118, after determining that the "EXECUTE" position within a fixed point processor is clear, the process passes to block 120. Block 120 illustrates the insertion of the associated translation lookaside buffer invalidate "TLBI" instruction into the "EXECUTE" position within the fixed point processor for this multiscalar processor. The process then passes to block 122. Block 122 illustrates the local performance of the translation lookaside buffer invalidate (TLBI) instruction.

Next, in accordance with an important feature of the present invention, the process passes to block 124. Block 124 illustrates a determination of whether or not all operations within memory queue 36 have achieved coherency. That is, each multiscalar processor within multiprocessor data processing system 6 is aware of the read and write operations which are pending within memory queue 36. In the event all operations within memory queue 36 (see FIG. 2) have not achieved coherency, the process merely iterates until such time as this condition occurs. Thereafter, after all read and write operations within memory queue 36 have achieved coherency, the process passes to block 126.

Block 126 illustrates the purging of the instruction queue prefetch buffers. Upon reference to the foregoing those skilled in the art will appreciate that the fetcher will necessarily execute faster than the instruction queue and as a consequence may prefetch instructions from addresses which have been invalidated by the execution of the translation lookaside buffer invalidate (TLBI) instruction. Therefore, it will be necessary to purge the instruction queue prefetch buffers to assure that all instructions placed within those buffers are fetched after the modification to the translation lookaside buffer (TLB) has occurred.

Next, the process passes to block 128. Block 128 illustrates the branching by this multiscalar processor to the stored pending instruction address, utilizing the modified translation lookaside buffer (TLB). As described above, this step is necessary to ensure that the instructions placed within the execution position in the processor have been retrieved utilizing the most recent data within the translation lookaside buffer (TLB). Thereafter, the flag "TLBI PENDING" is cleared and normal dispatch and execution of instructions is resumed. Thereafter, the process passes to block 130 and returns.

Figure 6:
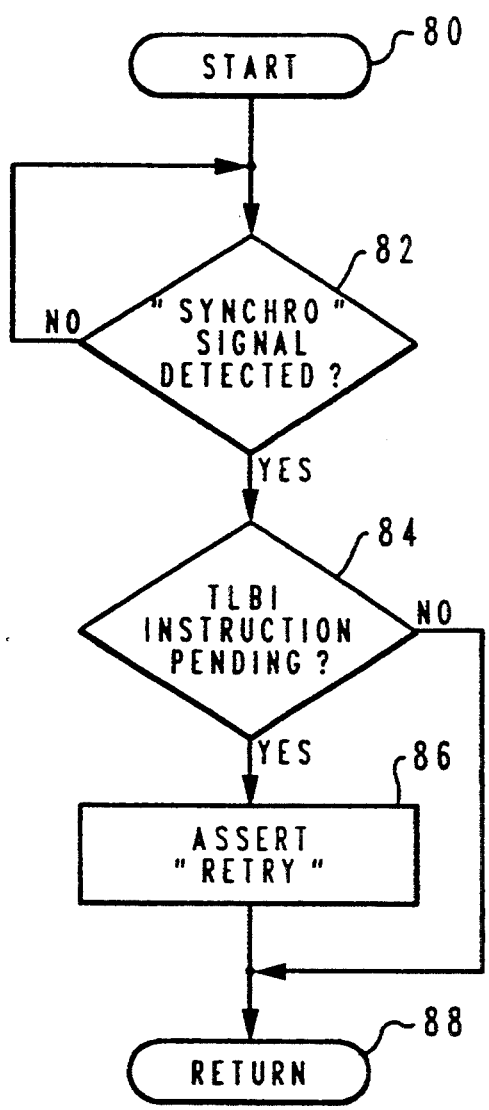
FIG. 6 is a high level logic flowchart illustrating the synchronization of multiple translation lookaside buffer invalidate (TLBI) instructions within the multiprocessor data processing system of FIG. 1 in accordance with the method and system of the present invention.

Finally, with reference to FIG. 6, there is depicted a high level logic flowchart illustrating the synchronization of multiple translation lookaside buffer invalidate (TLBI) instructions within the multiprocessor data processing system of FIG. 1 in accordance with the method and system of the present invention. As illustrated, this process begins at block 80 and thereafter passes to block 82. Block 82 illustrates the detection of a "SYNCHRO" signal by a multiscalar processor within multiprocessor data processing system 6. In the event this signal is not detected, the process merely iterates until such time as a "SYNCHRO" signal is detected.

After detecting a "SYNCHRO" signal, the process passes to block 84. Block 84 illustrates a determination of whether or not a translation lookaside buffer invalidate (TLBI) instruction is pending within the current multiscalar processor. This is preferably accomplished by checking the state of the "TLBI PENDING" flag within the processor. In the event the "TLBI PENDING" flag is not set, the process merely passes to block 88 and returns. Alternately, if the "TLBI PENDING" flag is set, the process passes to block 86. Block 86 illustrates the assertion by this processor of the "RETRY" message, indicating that synchronization has not yet been accomplished throughout the multiprocessor data processing system with respect to this translation lookaside buffer invalidate (TLBI) instruction.

Upon reference to the foregoing those skilled in the art will appreciate that the Applicants herein have presented a method and system for maintaining translation lookaside buffer (TLB) coherency in a multiprocessor system which does not require interprocessor interrupts and software synchronization and which achieves true coherency within each translation lookaside buffer (TLB) by broadcasting a bus structure associated with each translation lookaside buffer invalidate (TLBI) instruction which must be accepted by all multiscalar processors and by assuring that operations within the memory queue and instruction queues of each multiscalar processor are invalidated and thereafter completed utilizing the modified translation lookaside buffer (TLB). By inserting the translation lookaside buffer invalidate (TLBI) instruction into the execution pipeline within a multiscalar processor an effective branch to the next instruction will occur at the end of the execution of the translation lookaside buffer invalidate (TLBI) instruction, permitting subsequent instructions which have been prefetched to be discarded and refetched under the new context.

While the invention has been particularly shown and described with reference to a preferred embodiment, it will be understood by those skilled in the art that various changes in form and detail may be made therein without departing from the spirit and scope of the invention.

We claim:

1. A method for maintaining translation lookaside buffer coherency in a multiprocessor computer system having system memory and a plurality of processors coupled together via a bus, each of said plurality of processors including multiple processor units for executing multiple instructions, a memory management unit for performing read and write operations within said system memory and an associated translation lookaside buffer for translating effective addresses into real memory addresses within said system memory, said method comprising the steps of:

broadcasting a translation lookaside buffer invalidate bus structure along said bus in response to an execution of an associated translation lookaside buffer invalidate instruction within a selected one of said plurality of processors;

accepting said translation lookaside buffer invalidate bus structure at any remaining one of said plurality of processors only in response to an absence of a pending execution of a translation lookaside buffer invalidate instruction therein;

broadcasting a retry message along said bus in response to a nonacceptance of said translation lookaside buffer invalidate bus structure at any one of said plurality of processors; and executing said associated translation lookaside buffer invalidate instruction at all remaining processors among said plurality of processors only in response to an acceptance of said translation lookaside buffer invalidate bus structure at all remaining processors among said plurality of processors.

2. The method for maintaining translation lookaside buffer coherency in a multiprocessor computer system according to claim 1, further including the step of terminating execution of pending instructions within each of said plurality of processors in response to pending execution of said associated translation lookaside buffer invalidate instruction.

3. The method for maintaining translation lookaside buffer coherency in a multiprocessor computer system according to claim 2, further including the step of temporarily storing addresses of said pending instructions in response to pending execution of said associated translation lookaside buffer invalidate instruction.

4. The method for maintaining translation lookaside buffer coherency in a multiprocessor computer system according to claim 3, further including the step of inserting said associated translation lookaside buffer invalidate instruction into a processor unit within each of said plurality of processors following termination of pending execution of instructions therein.

5. The method for maintaining translation lookaside buffer coherency in a multiprocessor computer system according to claim 4, further including the step of suspending execution of instructions within each of said plurality of processors until such time as coherency is achieved with respect to all pending read and write operations within said system memory.

6. The method for maintaining translation lookaside buffer coherency in a multiprocessor computer system according to claim 5, further including the step of purging all instructions within each of said plurality of processors in response to achievement of coherency with respect to all pending read and write operations within said system memory.

7. The method for maintaining translation lookaside buffer coherency in a multiprocessor computer system according to claim 6, further including the step of loading said pending instructions into each of said plurality of processors utilizing said temporarily stored addresses as translated by said translation lookaside buffer after execution of said associated translation lookaside buffer invalidate instruction following purging of all instructions within each of said processors.

8. A system for maintaining translation lookaside buffer coherency in a multiprocessor computer system having system memory and a plurality of processors coupled together via a bus, each of said plurality of processors including multiple processor units for executing multiple instructions, a memory management unit for performing read and write operations within said system memory and an associated translation lookaside buffer for translating effective addresses into real memory addresses within said system memory, said system comprising:

means for broadcasting a translation lookaside buffer invalidate bus structure along said bus in response to an execution of an associated translation lookaside buffer invalidate instruction within a selected one of said plurality of processors;

means for accepting said translation lookaside buffer invalidate bus structure at any remaining one of said plurality of processors only in response to an absence of a pending execution of a translation lookaside buffer invalidate instruction therein;

means for broadcasting a retry message along said bus in response to a nonacceptance of said translation lookaside buffer invalidate bus structure at any one of said plurality of processors; and means for executing said associated translation lookaside buffer invalidate instruction at all remaining processors among said plurality of processors only in response to an acceptance of said translation lookaside buffer invalidate bus structure at all remaining processors among said plurality of processors.

9. The system for maintaining translation lookaside buffer coherency in a multiprocessor computer system according to claim 8, further including means for terminating execution of pending instructions within each of said plurality of processors in response to pending execution of said associated translation lookaside buffer invalidate instruction.

10. The system for maintaining translation lookaside buffer coherency in a multiprocessor computer system according to claim 9, further including means for storing addresses of said pending instructions in response to pending execution of said associated translation lookaside buffer invalidate instruction.

11. The system for maintaining translation lookaside buffer coherency in a multiprocessor computer system according to claim 10, further including means for inserting said associated translation lookaside buffer invalidate instruction into a processor unit within each of said plurality of processors following termination of pending execution of instructions therein.

12. The system for maintaining translation lookaside buffer coherency in a multiprocessor computer system according to claim 11, further including means for suspending execution of instructions within each of said plurality of processors until such time as coherency is achieved with respect to all in pending read and write operations within said system memory.

13. The system for maintaining translation lookaside buffer coherency in a multiprocessor computer system according to claim 12, further including means for purging all instructions within each of said plurality of processors in response to achievement of coherency with respect to all pending read and write operations within said system memory.

14. The system for maintaining translation lookaside buffer coherency in a multiprocessor computer system according to claim 13, further including means for loading said pending instructions into each of said plurality of processors utilizing said temporarily stored addresses as translated by said translation lookaside buffer after execution of said associated translation lookaside buffer invalidate instruction following purging of all instructions within each of said processors.

* * * * *